United States Patent
Fukagawa et al.

(10) Patent No.: US 7,732,976 B2
(45) Date of Patent: Jun. 8, 2010

(54) PIEZOELECTRIC ACTUATOR DRIVE DEVICE

(75) Inventors: Yasuhiro Fukagawa, Oobu (JP); Tsutomu Nakamura, Kariya (JP); Tatsuya Kakehi, Anjo (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 12/496,763

(22) Filed: Jul. 2, 2009

(65) Prior Publication Data
US 2010/0001618 A1 Jan. 7, 2010

(30) Foreign Application Priority Data
Jul. 7, 2008 (JP) .............................. 2008-176931

(51) Int. Cl.
*H01L 41/09* (2006.01)
(52) U.S. Cl. ................................. 310/316.03; 310/317
(58) Field of Classification Search ............ 310/316.01, 310/316.03, 317
See application file for complete search history.

(56) References Cited

U.S. PATENT DOCUMENTS

2007/0296307 A1* 12/2007 Fukagawa et al. ...... 310/316.03
2009/0051247 A1* 2/2009 Kakehi et al. .......... 310/316.03

* cited by examiner

*Primary Examiner*—Thomas M Dougherty
(74) *Attorney, Agent, or Firm*—Nixon & Vanderhye PC (57) ABSTRACT

In a piezoelectric actuator control device for controlling operation of one or more piezoelectric actuators, when receiving a drive signal of a low level, a discharging switch is repeatedly turned on and off in order to discharge electric charge accumulated in the piezoelectric actuator. That is, the discharging switch is kept ON until a discharging current from a piezoelectric actuator reaches a peak threshold value Ip. When the discharging current reaches the peak threshold value Ip, the discharging switch is turned OFF and kept OFF until a discharging current from a piezoelectric actuator reaches a peak threshold value Ip. The device has a threshold value setting circuit for increasing the peak threshold value according to a discharging period of time.

8 Claims, 7 Drawing Sheets

PIEZOELECTRIC ACTUATOR DRIVE DEVICE

CROSS-REFERENCE TO RELATED APPLICATION

This application is related to and claims priority from Japanese Patent Application No. 2008-176931 filed on Jul. 7, 2008, the contents of which are hereby incorporated by reference.

BACKGROUND OF THE INVENTION

1. Field of the Invention

The present invention relates to a piezoelectric actuator drive device capable of driving a piezoelectric actuator.

2. Description of the Related Art

Piezoelectric actuators are well known and widely used in various types of devices. In general, a piezoelectric actuator expands and contracts by electrical charging and discharging in order to control a linear motion of a piston. For example, a piezoelectric actuator controls the linear motion of a piston in a fuel injection device for an internal combustion engine in order to control opening and closing of a valve of a fuel injector. Conventional documents such as Japanese patent laid open publications No. JP 2003-92438 and No JP 2007-205173 disclose such piezoelectric actuators.

There is a known drive device that charges and discharges a piezoelectric actuator in order to expand and contract the piezoelectric actuator. The drive device is comprised of a charging path, a discharging path, a first diode, and a second diode. A DC power source supplies an electric power to a series circuit composed of an inductor and the piezoelectric actuator through the charging path and a charging switch. The charging switch is composed of a metal oxide semiconductor field effect transistor (MOS FET) mounted to the charging path. The electric charge accumulated in the piezoelectric actuator are discharged through the discharging path and a discharging switch connected in parallel to the series circuit. The discharging switch is composed of a MOS FET mounted to the discharging path.

The first diode is connected in parallel to the charging switch so that the cathode of the first diode is connected to the positive electrode of the DC power source. The second diode is connected in parallel to the discharging switch so that the anode of the second diode is connected to the negative electrode of the DC power source.

When receiving a drive signal transferred from an external device, the above drive device for the piezoelectric actuator repeats ON-OFF operation of the charging switch while setting the discharging switch to the OFF state in order to expand the piezoelectric actuator by accumulating electric charge into the piezoelectric actuator.

When receiving no drive signal, the drive device repeats ON-OFF operation of the discharging switch under the OFF state of the charging switch in order to contract the piezoelectric actuator by discharging the electric charge accumulated in the piezoelectric actuator.

During the charging period of the piezoelectric actuator, a charging current is supplied from the DC power source to the piezoelectric actuator through the charging path by turning the charging switch ON. After this, by turning the charging switch OFF, a charging current (namely, a fly wheel current), which flows by the electrical energy charged in the inductor, is supplied to the piezoelectric actuator through the second diode connected in parallel to the discharging switch. The above ON and OFF operations are repeated in order to gradually charge the piezoelectric actuator.

During the discharging period of the piezoelectric actuator, a discharging current is supplied from the positive electrode of the piezoelectric actuator to the discharging path through the inductor by turning the discharging switch ON. After this, the discharging current is supplied from the positive electrode of the piezoelectric actuator to the DC power source through the first diode connected in parallel to the inductor and the charging switch by turning the discharging switch OFF. The electric charge accumulated in the piezoelectric actuator can be recovered to the DC power source by the discharging current. Those operations are repeated in order to discharge the piezoelectric actuator in steps.

In the control of discharging the piezoelectric actuator, the discharging switch is firstly turned ON, and the discharging switch is turned OFF when the detection value of a discharging current from the piezoelectric actuator reaches a peak threshold value. The discharging switch which is OFF is then turned ON when the detection value of the discharging current from the piezoelectric actuator reaches a bottom threshold value. Those operations are repeated.

The conventional document JP 2003-92438 has disclosed the technique to maintain a discharging energy by increasing the above peak threshold value (or a breaking current) according to the elapse of the discharging time. Because the voltage of the piezoelectric actuator is decreased according to the elapse of discharging time, the total amount of energy released as a time product can be kept at a constant by increasing the current of the piezoelectric actuator in order to avoid the fluctuation of the discharging period of time (necessary to discharge).

The conventional document JP 2007-205173 discloses the technique of discharging the electric charge accumulated in the piezoelectric actuator for a predetermined period of time by adjusting the peak threshold value for the discharging control according to the amount of the electric charge of piezoelectric elements in the piezoelectric actuator.

On the other hand, Japanese patent laid open publication No. JP 2008-5649 discloses a conventional technique of charging a piezoelectric actuator to a target amount of energy.

The conventional technique disclosed in JP 2003-92438 only increases a peak threshold value for use in the discharging control for the piezoelectric actuator at a constant gradient. It is accordingly difficult to control an energy discharging change rate (or a rate of energy change during discharging) of the piezoelectric actuator at an optional constant value. In addition, because the energy discharging change rate is changed when an electrostatic capacity of the piezoelectric actuator is changed during the charge of the piezoelectric actuator, the period of time need to discharge is changed.

On the other hand, the conventional technique disclosed in JP 2007-205173 changes the peak threshold value, which is constant to the period of time, in accordance with the amount of electric charge accumulated in the piezoelectric actuator. Because the discharging energy is decreased approximately based on a quadratic function, it is impossible to adjust the energy discharging change rate to an optional constant value.

SUMMARY OF THE INVENTION

It is an object of the present invention to provide a piezoelectric actuator control device capable of adjusting a discharging energy rate of a piezoelectric actuator to an optional constant value.

To achieve the above purpose, the present invention provides a piezoelectric actuator drive device comprised of an inductor, a charging path, a charging switch, a discharging path, a discharging switch, a first diode, a second diode, a charging control means, a discharging control means, and a threshold value setting means. the inductor is connected in series to one or more piezoelectric actuators. The charging path is connected to a direct current (DC) power source and a series circuit. The series circuit is composed of the inductor and the piezoelectric actuators. The DC power source supplies an electric power to the series circuit through the charging path. The charging switch is placed on the charging path between the DC power source and the series circuit. The discharging path is connected in parallel to the serial circuit. Through the discharging path the electric charge accumulated in the piezoelectric actuators is discharged. The discharging switch is connected in parallel to the series circuit and placed on the discharging path. The first diode is connected in parallel to the charging switch so that a cathode of the first diode is connected to a positive electrode of the DC power source. The second diode is connected in parallel to the discharging switch so that an anode of the second diode is connected to a negative electrode of the DC power source. The charging control means instructs the charging switch to be repeatedly turned ON and OFF in order to expand and contract the piezoelectric actuators when receiving a drive signal as an instruction signal supplied from an outside device. The discharging control means is comprised of a discharging current detection means for detecting a discharging current from the piezoelectric actuators, and the discharging control means instructing the discharging switch to be turned ON when receiving a drive stop signal (as a drive signal) supplied from the outside device, and repeatedly performing ON and OFF operation of the discharging switch so that the discharging switch is turned OFF when detecting that the discharging current reaches a peak threshold value and the discharging switch is turned ON when detecting that the discharging current reaches a bottom threshold value. The threshold value setting means is configured to set the peak threshold value so that the peak threshold value is increased in proportion to an elapse of time. The threshold value setting means is comprised of an electric charge detection means for detecting an amount of electric charge accumulated in the piezoelectric actuators by the charging control means. The threshold value setting means is configured to determine a gradient and an intercept of the peak threshold value per time in order to set an energy discharging change rate of the piezoelectric actuators into $\Delta E/T$ based on (a) to (e); (a) a charged energy E0 accumulated into the piezoelectric actuators by the charging control means, (b) a discharging energy $\Delta E$ to be discharged from the piezoelectric actuators by the discharging control means over (c) a discharging period of time T, (d) the bottom threshold value, and (e) the amount Q0 of the accumulated electric charge detected by the electric charge detection means. Further, the threshold value setting means is configured to set the peak threshold value based on the gradient, the intercept, and the elapse of time counted from a start time to discharge the piezoelectric actuators.

The piezoelectric actuator drive device according to the present invention has the following effects.

(1) It is possible to obtain the discharging energy changing rate $\Delta E/T$ that is a ratio between the given discharging energy $\Delta E$ and the discharging period T of time because the gradient and the intercept of the peak threshold value to time can be changed by changing the values of the discharging energy $\Delta E$ and the value of the discharging period T of time to be supplied to the threshold value setting means. The piezoelectric actuator control device according to the present invention can control the discharging energy changing rate $\Delta E/T$ at an optional constant value.

(2) Because the gradient "a" and the intercept "b" of the peak threshold value Ip(t) are set according to the detection value of the amount $Q_0$ of the electric charge accumulated in the piezoelectric actuators, it is possible to efficiently adjust the discharging energy changing rate to a target constant value even if the capacitance of the piezoelectric actuators are changed according to the temperature change.

That is, even if the charged energy $E_0$ takes a same value, the amount $Q_0$ of the electric charge accumulated in the piezoelectric actuator is changed when the capacitance of the piezoelectric actuator is changed due to the temperature change. According to the piezoelectric actuator control device detects the actual amount $Q_0$ of the electric charge, and sets the gradient and the intercept of the peak threshold value based on the actual amount $Q_0$ of the electric charge.

It is thereby possible to suppress the fluctuation of the discharging energy changing rate $\Delta E/T$ caused by the temperature change.

(3) Because the discharging energy changing rate $\Delta E/T$ to be controlled is a known value, and set to a constant value, it is possible to simply obtain the discharged energy amount ($=t \times \Delta E/T$) based on the discharging period t of time. When the amount of discharged energy is detected, the energy amount remaining in the piezoelectric actuator can be calculated because the charged energy $E_0$ is a known value. It is therefore possible to control the piezoelectric actuator 1 based on the remaining energy amount.

In the piezoelectric actuator drive device as another aspect of the present invention, the threshold value setting means increases the gradient and the intercept of the peak threshold value according to increase in the amount of the electric charge detected by the electric charge detecting means. That is, the more the gradient and the intercept of the peak threshold value are increased, the more the amount of the discharged electric charge per time is increased.

In the piezoelectric actuator drive device as another aspect of the present invention, the threshold value setting means sets the peak threshold value based on a following equation (1):

$$I_{p(t)} = \frac{2Q_0}{T}\left[\frac{\left\{-\frac{\Delta E}{E_0 \times T}\sqrt{\frac{E_0}{E_0 - \Delta E}} + \frac{2}{T}\left(1 - \sqrt{\frac{E_0 - \Delta E}{E_0}}\right)\right\} \times}{t + \left\{\frac{\Delta E}{2E_0}\sqrt{\frac{E_0}{E_0 - \Delta E}} - 2\left(1 - \sqrt{\frac{E_0 - \Delta E}{E_0}}\right)\right\}}\right] - I_b. \quad (1)$$

where $I_{p(t)}$ is the peak threshold value under a positive charging direction, and Ib is the bottom threshold value under the positive charging direction.

By the way, it is possible for the threshold value setting means to set the peak threshold value based on a following equation (2):

$$I_{p(t)} = 2\frac{Q_0}{T}\left((1-\sqrt{2})\frac{\Delta E^2}{E_0^2 T}t - \frac{\Delta E}{2E_0}\right) - I_b. \quad (2)$$

where $I_{p(t)}$ is the peak threshold value under the positive charging direction, and Ib is the bottom threshold value under the positive charging direction.

In the right side in each of the equations (1) and (2), the term depend on "t" corresponds to the gradient of the peak threshold value Ip(t), and the remained term not depend on (or not multiplied with) the value of "t" corresponds to the intercept of the peak threshold value Ip(t). The embodiment according to the present invention will explain how to obtain the equations (1) and (2) in detail.

In the piezoelectric actuator drive device as another aspect of the present invention, the electric charge detection means detects the charging current supplied to the piezoelectric actuators when the charging control means instructs the charging switch to charge the piezoelectric actuators, and detects the amount of the electric charge accumulated in the piezoelectric actuators by integrating the detected charging current. It is thereby possible to simply detect the amount $Q_0$ of the electric charge accumulated in the piezoelectric actuators.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the piezoelectric actuator drive device according to the first embodiment of the present invention with reference to FIG. 1 to FIG. 7.

Figure 1:
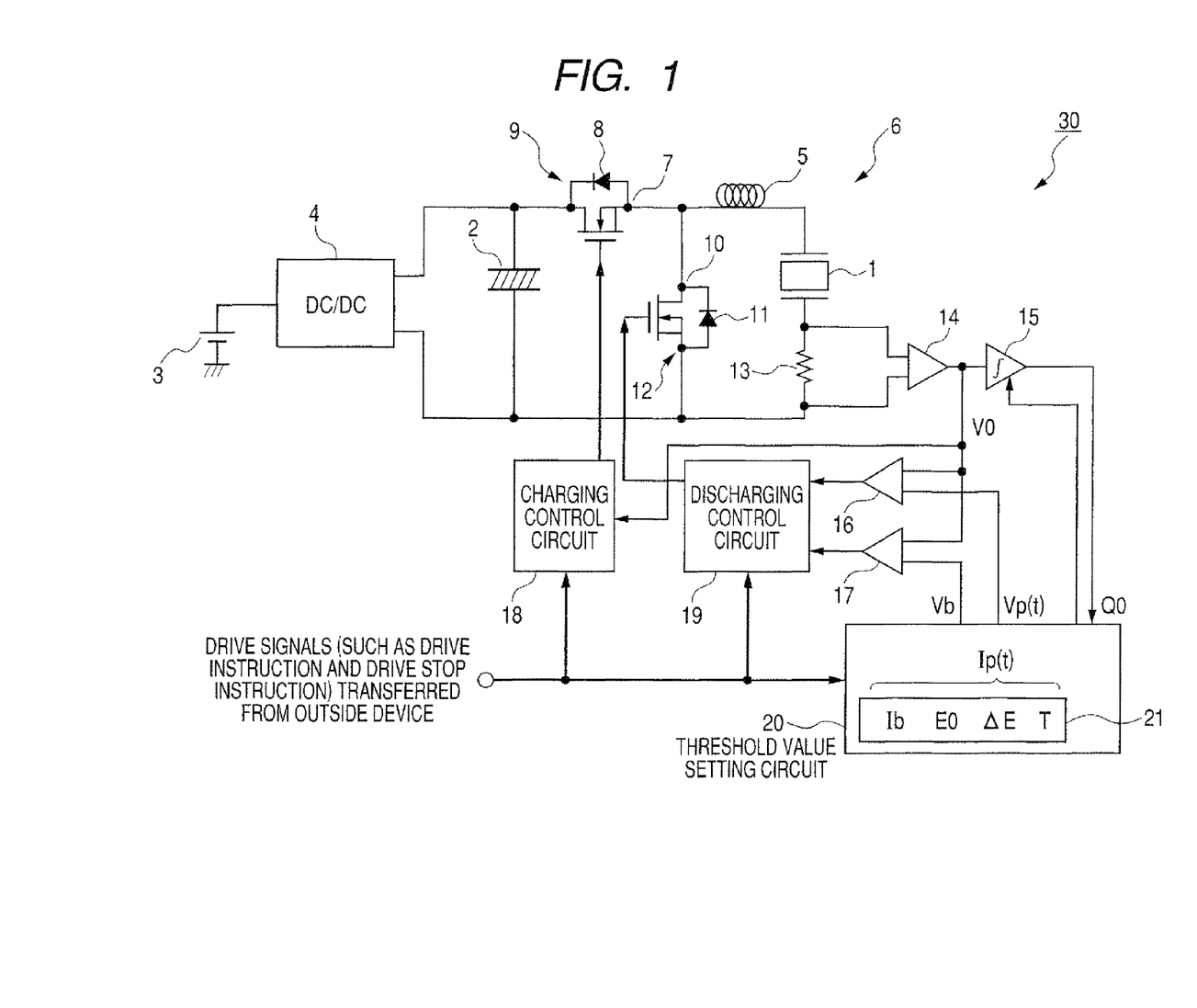
FIG. 1 is a block diagram showing a structure of a piezoelectric actuator drive device according to embodiments of the present invention.

FIG. 1 is a block diagram showing a structure of the piezoelectric actuator drive device 30 according to the embodiments of the present invention. The piezoelectric actuator drive device 30 is a component of a fuel injection device for a diesel engine mounted onto a vehicle.

A diesel engine mounted to a diesel-engine vehicle has cylinders with injectors. Each of the injectors injects a high pressure fuel supplied from a common rail into each of the cylinders of the diesel engine. A piezoelectric actuator 1 is mounted to each of the cylinders. The piezoelectric actuator drive device 30 controls charging and discharging each of the piezoelectric actuators 1 in order to expand and contract it. The expansion and contraction of each of the piezoelectric actuators 1 controls the injector to start and stop the fuel injection into the corresponding cylinder.

FIG. 1 shows only one of the piezoelectric actuators 1 for brevity. The following explanation will show the operation of one of the piezoelectric actuators 1.

As shown in FIG. 1, the piezoelectric actuator drive device 30 according to the first embodiment is comprised of a capacitor 2 (or a condenser) and a booster 4. The capacitor 2 acts as a DC (direct current) power source storing electrical energy to charge the piezoelectric actuator 1. The booster 4 boosts the voltage (or a battery voltage) of the on-vehicle battery 3 in order to charge the capacitor 2 so that the voltage of the capacitor 2 is higher than a predetermined voltage of more than the battery voltage.

The piezoelectric actuator drive device 30 is further comprised of an inductor 5, a charging path 9, and a discharging path 12. The inductor 5 is connected in series to the piezoelectric actuator 1. Through a charging switch 7 mounted to the charging path 9, the electric power (or electric charge) is supplied from a positive electrode of the capacitor 2 to a series circuit. The series circuit is composed on the inductor 5 and the piezoelectric actuator 1. Further, through a discharging switch 10 mounted to the discharging path 12, the electric charge stored in the piezoelectric actuator 1 is discharged. The discharging path 12 is connected in parallel to the series circuit 6.

The end of the series circuit 6 at the piezoelectric actuator 1 side (namely, one end of the piezoelectric actuator 1 opposite to the inductor 5 side) is connected to a ground line as a negative electrode of the capacitor 2 through a resistance 13. This resistance 13 acts as a current detection resistance to detect the current (a charging current and a discharging current) that flows through the piezoelectric actuator 1.

Another end of the series circuit 6 at the inductor 5 side (namely, the end of the piezoelectric actuator 1 opposite to the piezoelectric actuator 1 side) is connected to the positive electrode of the capacitor 2 through the charging switch 7. A diode 8 (as a circulation circuit) is connected in parallel to the charging switch 7 so that the cathode of the diode 8 is connected to the positive electrode of the capacitor 2.

The diode 8 supplies the circulation current to the capacitor 2 when the discharging switch 10 is turned ON when the piezoelectric actuator 1 is discharged.

The charging switch 7 is composed of a n-channel MOSFET (a n-channel Metal Oxide Semiconductor Field Effect Transistor) in which the drain of the MOSFET is connected to the positive electrode of the capacitor 2, and the source of the MOSFET is connected to one end of the inductor 5. A parasitic diode in the MOSFET is used as the diode 8.

The discharging switch 10 forms the discharging path 12 when turned ON. The discharging switch 10 is also composed of a n-channel MOSFET. The source of the MOSFET is connected to the ground line and the drain thereof is connected to a connection node between the charging switch 7 and the inductor 5.

In the discharging switch 10, a diode 11 (as a circulation circuit) is connected in parallel to the n-channel MOSFET so that the anode of the diode 11 is connected to the ground line.

The diode 11 is capable of flowing a fly wheel current supplied from the inductor 5 when the charging switch 7 is switched from ON to OFF. The diode 11 is a parasitic diode of the n-channel MOSFET forming the discharging switch 10.

The piezoelectric actuator drive device 30 of the first embodiment is further comprised of an amplifying circuit 14, an integral circuit 15, a pair of comparators 16 and 17, a charging control circuit 18, a discharging control circuit 19, and a threshold value setting circuit 20.

The amplifying circuit 14 acts as a current detection circuit for amplifying and outputting a voltage at both the ends of the resistance 13. The integral circuit 15 acts as an electric charge detection circuit for integrating the output voltage V0 from the amplifying circuit 14. The charging control circuit 18 performs the charging control of the piezoelectric actuator 1. The discharging control circuit 19 performs the discharging control of the piezoelectric actuator 1. The threshold value setting circuit 20 sets a threshold value for use in tile discharging control.

The comparator 16 compares a threshold voltage Vp as a peak threshold voltage with an output voltage V0 from the amplifying circuit 14. The threshold voltage Vp corresponds to the peak threshold value Ip of the discharging current of the piezoelectric actuator 1.

The comparator 17 compares a threshold voltage Vb as a bottom threshold voltage with the output voltage V0 of the amplifying circuit 14. The threshold voltage corresponds to the bottom threshold value Ib of the discharging current of the piezoelectric actuator 1.

Through the first embodiment, the direction of the current flowing into the piezoelectric actuator 1 and the resistance 13 is referred to as the "positive charging direction". On the other hand, the direction of the current flowing from the piezoelectric actuator 1 and the resistance 13 is referred to as the "negative charging direction". That is, the discharging current of the piezoelectric actuator 1 is negative and the output voltage V0 of the amplifying circuit 14 when the discharging of the piezoelectric actuator 1 is also negative. Further, both the peak threshold value Ip and the bottom threshold value Ib of the discharging current are negative. Both the peak threshold voltage Vp and the bottom threshold voltage Vb corresponding to the peak threshold value Ip and the bottom threshold value Ib of the discharging current. Further, because the peak threshold value Ip and the bottom threshold value Ib have a relationship of Ip<Ib, and |Ip|>|Ib| (shown in FIG. 4), the peak threshold voltage Vp and the bottom threshold voltage Vb have a relationship of Vp<Vb, and |Vp|>|Vb|.

When V0≦Vp, the comparator 16 outputs the output signal of a high level to the discharging control circuit 19. When the absolute value of the discharging current of the piezoelectric actuator 1 is increased and finally reaches the absolute value of the peak threshold value Ip, the comparator 16 outputs the output signal of a low level to the discharging control circuit 19.

When V0≧Vp, the comparator 17 outputs the output signal of a high level to the discharging control circuit 19. When the absolute value of the discharging current of the piezoelectric actuator 1 is decreased, and finally reaches the absolute value of the bottom threshold value Ib, the comparator 17 outputs the output signal of a high level to the discharging control circuit 19.

In the following explanation, increasing and decreasing of the discharging current of the piezoelectric actuator 1 mean increase and decrease of the absolute value of the discharging current. Increasing the discharging current to the peak threshold value Ip means that the absolute value of the discharging current reaches the absolute value of the peak threshold value Ip. Further, decreasing the discharging current to the bottom threshold value Ib means that the absolute value of the discharging current reaches the absolute value of the bottom threshold value Ib.

The threshold value setting circuit 20 outputs the threshold voltage Vp to the comparator 16 and the threshold voltage Vb to the comparator 17. The operation of the threshold value setting circuit 20 will be explained later in detail.

On the other hand, the charging control circuit 18 monitors the output voltage V0 of the amplifying circuit 14 and detects the charging current flowing into the piezoelectric actuator 1. The charging control circuit 18 receives a drive signal (as an injection instruction signal) to open the injector. The drive signal is transferred from a microcomputer (not shown) that acts as an electrical control unit to control the operation of the engine of the vehicle. Through the first embodiment, the drive signal of a high level instructs the injector to open. It is acceptable that the piezoelectric actuator drive device 30 according to the first embodiment of the present invention is mounted onto either the inside or the outside of the electrical control unit.

The charging control circuit 18 performs the charging control of the piezoelectric actuator 1 by turning the charging switch 7 ON and OFF when the drive signal becomes a high level in order to charge the piezoelectric actuator 1. During the charging control of the piezoelectric actuator 1, the discharging switch 10 is maintained in the OFF state.

That is, when the charging switch 7 is turned ON in the piezoelectric actuator drive device 30, the charging current flows into the piezoelectric actuator 1 through the capacitor 2, the charging path 9, and the inductor 5. When the charging switch 7 is turned OFF, the charging current by the energy accumulated in the inductor 5 flows into the piezoelectric actuator 1 through the diode 11 connected in parallel to the discharging switch 10.

The charging control repeatedly switches the charging switch 7 ON and OFF in order to charge the piezoelectric actuator 1. This expands the piezoelectric actuator 1 and thereby opens the injector.

A description will now be given of the charging control of the piezoelectric actuator drive device 30.

The charging control circuit 18 turns the charging switch 7 ON when receiving the drive signal of a high level. When detecting that the current flowing through the piezoelectric actuator 1 reaches a predetermined voltage (for example, 25A) based on the output voltage V0 of the amplifying circuit 14, the charging control circuit 18 turns the charging switch 7 OFF, and stores the ON-period for the first time of the charging switch 7 into the memory 21 such as a RAM or a ROM.

When detecting that the charging current of the piezoelectric actuator 1 is decreased to zero (0A) after the OFF state of the charging switch 7 for the first time, the charging control circuit 18 turns the charging switch 7 ON. After this, when detecting that the charging current reaches zero (0A), the charging control circuit 18 turns the charging switch 7 ON for the ON period of time stored in the memory. The above operation repeats predetermined times.

Because the above charging control provides a constant charged energy per time, it is possible to accumulate a target amount of the electrical energy (charged energy) into the piezoelectric actuator 1.

It is possible for the charging control circuit 18 to perform the charging control disclosed in the document JP 2008-5649. In this case, the charging control circuit 18 is comprised of a target value setting means, a current detection means, an estimation means, and a charging switch drive means. The target value setting means sets a target value of the charged energy of the piezoelectric actuator 1 during the ON period of the charging switch 7 based on a voltage of the capacitor 2 and the charged energy (namely, the target charged energy) to be supplied to the piezoelectric actuator 1 during the charging period for a first time.

The current detection means detects the charging current to be supplied to the series circuit 6 from the capacitor 2 during the ON period of the charging switch 7.

The estimation means estimates the charged energy of the piezoelectric actuator 1 during the ON period of the charging switch 7 by integrating the charging current detected by the current detection means.

The charging switch drive means turns the charging switch 7 to ON when the drive signal becomes a high level, and then turns it OFF when the estimated value obtained by the estimation means reaches the target value set by the target value setting means.

Next, the discharging control circuit 19 also receives the above drive signal. The discharging control circuit 19 controls discharge of the piezoelectric actuator 1 for a predetermined period of time to turn the discharging switch 10 to ON and OFF when the drive signal is switched from the high level to the low level. During the discharging control, the charging switch 7 is set to OFF.

That is, in the piezoelectric actuator drive device 30, when the discharging switch 10 is turned ON, the discharging current flows from the positive electrode of the piezoelectric actuator 1 to the ground line side through the inductor 5 and the discharging path 12. On the other hand, when the discharging switch 10 under the ON state is turned OFF, the discharging current flows from the positive electrode of the piezoelectric actuator 1 to the capacitor 2 through the inductor 5 and the diode 8 connected in parallel to the charging switch 7. The electric charge in the piezoelectric actuator 1 is thereby recovered to the capacitor 2 by the above discharging current. The repetition of the ON/OFF operation of the discharging switch 10 by the discharging control constructs the piezoelectric actuator 1 in step, and the injector is thereby closed.

A description will now be given of the discharging control by the piezoelectric actuator drive device 30 according to the first embodiment of the present invention.

Figure 2:
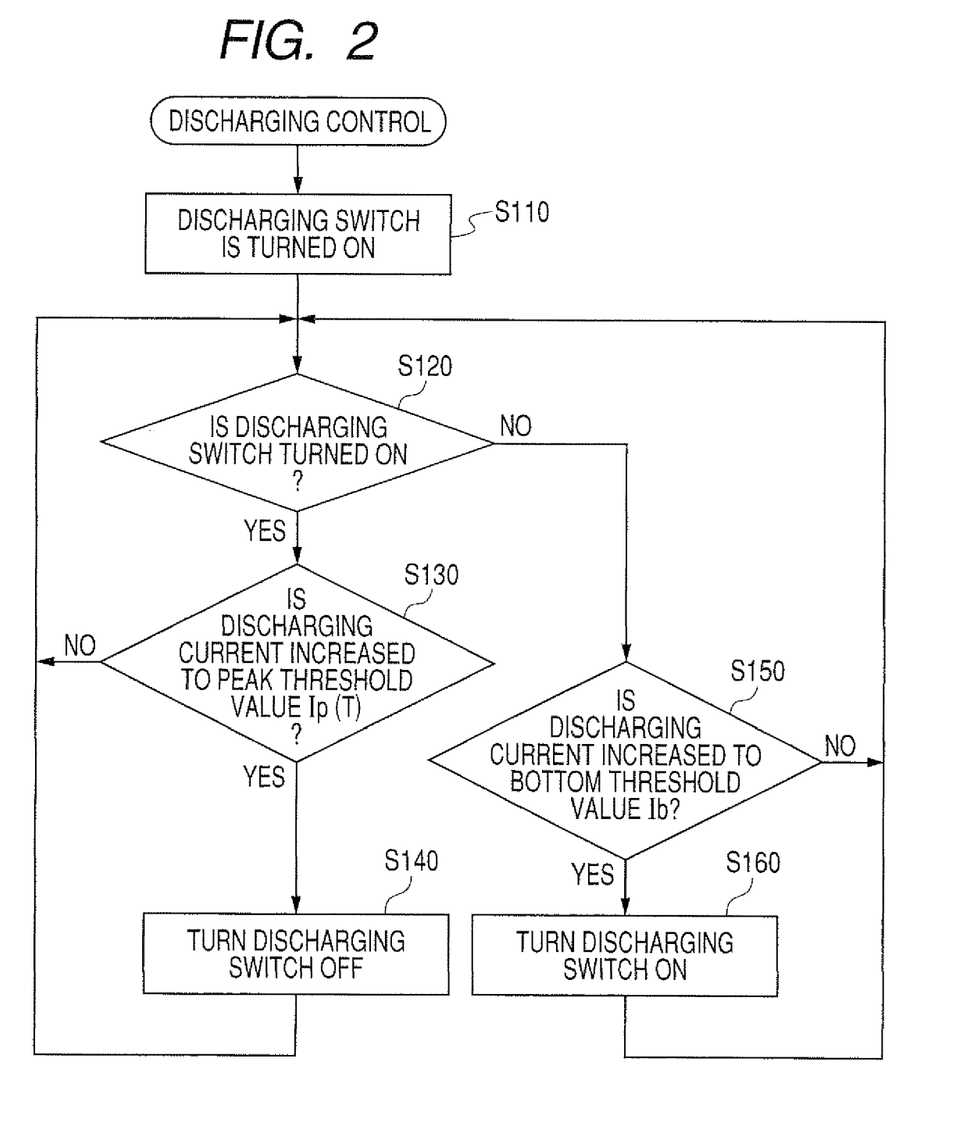
FIG. 2 is a flow chart showing a discharging control by the piezoelectric actuator drive device shown in FIG. 1.

FIG. 2 is a flow chart showing the discharging control by the piezoelectric actuator drive device 30 shown in FIG. 1. As shown in FIG. 2, the discharging control circuit 19 turns the discharging switch 10 ON (step S110) when the drive signal is switched from a high level to a low level.

During the ON state of the discharging switch 10 ("YES" in step S120), the discharging control operation is paused until the discharging current of the piezoelectric actuator 1 reaches the peak threshold value Ip that is set by the threshold value setting circuit 20 ("NO" in step S130). Specifically, the execution of the discharging control operation is paused until the output signal of the comparator 16 is switched from a low level to a high level.

When it is detected that the output signal from the comparator 16 becomes a high level and the discharging current reaches the peak threshold value Ip ("YES" in step S130), the discharging switch 10 is turned OFF (step S140).

On the other hand when the discharging switch 10 is turned OFF ("NO" in step S120), the execution of the discharging control operation is paused until the discharging current of the piezoelectric actuator 1 reaches the bottom threshold value Ib ("NO" in step S150). Specifically, the execution of the discharging control operation is paused until the output signal of the comparator 17 is switched from a low level to a high level. When it is detected that the output signal of the comparator 17 becomes the high level and the discharging current is decreased to the bottom threshold value Ib (step S150), the discharging switch 10 is turned ON (step S160).

The discharging control circuit 19 performs the above discharging control from the time when the drive signal becomes a low level to the time when the predetermined period of time is elapsed.

Although the discharging control period (to perform the discharging control) is a fixed value, for example, it is acceptable to use a variable value instructed by the microcomputer in the electrical control unit.

Next, a description will now be given of the threshold value setting circuit 20, as a most important feature of the first embodiment, in the piezoelectric actuator drive device 30.

The threshold value setting circuit 20 receives a charged energy $E_0$, a discharging energy $\Delta E$, a discharging period T of time, and a bottom threshold value Ib transferred from the charging control circuit 18, and stores those values ($E_0$, $\Delta E$, T, and Ib) into the memory 21 such as a RAM or a ROM in the threshold value setting circuit 20.

Each of the values ($E_0$, $\Delta E$, T, and Ib) is stored as a fixed value into the memory 21. It is acceptable for the microcomputer in the electrical control unit to set optional values into the memory 21.

In particular when the discharging period of time is variable, it is possible to write the same value of the discharging execution period of time as the discharging period T of time into the memory 21. Similar, when the charging energy to charge the piezoelectric actuator 1 is variable during the charging control, it is possible to write the same value of the target charged energy as the charged energy $E_0$ into the memory 21.

The threshold value setting circuit 20 resets the integral circuit 15 when the drive signal is switched to a high level. The threshold value setting circuit 20 reads the output value of the integral circuit 15 when the drive signal becomes a low level. The threshold value setting circuit 20 detects the amount Q of the electric charge which is accumulated in the piezoelectric actuator 1 during the charging control by the charging control circuit 18.

The integral circuit 15 integrates the charging current flowing through the piezoelectric actuator 1 during the charging control, and the threshold value setting circuit 20 calculates the amount Q of the electric charge from the integrated value.

The threshold value setting circuit 20 calculates a gradient "a" and an intercept "b" to the peak threshold value Ip in order that the discharging energy changing rate of the piezoelectric actuator 1 is set to $\Delta E/T$.

The threshold value setting circuit 20 determines the peak threshold value Ip based on the gradient "a", the intercept "b", and the discharging starting time (namely, at the time when the drive signal is changed to a low level) using the following equation (3):

$$I_{p(1)} = \left\{ -\frac{2\Delta E \times Q_0}{E_0 \times T^2} \sqrt{\frac{E_0}{E_0 - \Delta E}} + \frac{4Q_0}{T^2}\left(1 - \sqrt{\frac{E_0 - \Delta E}{E_0}}\right) \right\} \times t + \quad (3)$$

$$\left\{ \frac{\Delta E \times Q_0}{E_0 \times T} \sqrt{\frac{E_0}{E_0 - \Delta E}} - \frac{4Q_0}{T}\left(1 - \sqrt{\frac{E_0 - \Delta E}{E_0}}\right) - I_b \right\}.$$

In the equation (3), the left side "{ }" multiplied by the value "t" corresponds to the gradient "a" of the peak threshold value Ip, and the right side "{ }" corresponds to the intercept "b" in the threshold value Ip.

Because the peak threshold value Ip is a value in proportion to the time "t", the peak threshold value Ip is designated by the time function Ip(t) in FIG. 1, FIG. 2 and the above equation (3). The time function Ip(t) indicates that the peak threshold value Ip is a functional value of time "t".

Hereinafter, the subscript "(t)" is added into the values that are changed according to time. In the equation (3), the values Ip(t) and Ib flows in the positive charging direction.

The threshold value setting circuit 20 multiplies the peak threshold value Ip(t) set by the equation (3) with the value of the resistance 13 and the amplifying rate of the amplifying circuit 14, and outputs the multiplying result as the threshold voltage Vp to the comparator 16. The threshold value setting circuit 20 further multiplies the bottom threshold value Ib stored in the memory 21 with the value of the resistance 13 and the amplifying rate of the amplifying circuit 14, and outputs the multiplying result as the threshold value Vb to the comparator 17. Because the threshold value Vp is changed according to the elapse of time, the VP is expressed by Vp(t).

A description will now be given of the calculation method of the equation (3). In the explanation, the charging direction to which the charging current flows into the piezoelectric actuator 1 is the positive charging direction. On the other hand, the discharging direction to which the discharging current flows from the piezoelectric actuator 1 is the negative charging direction.

Figure 3A:
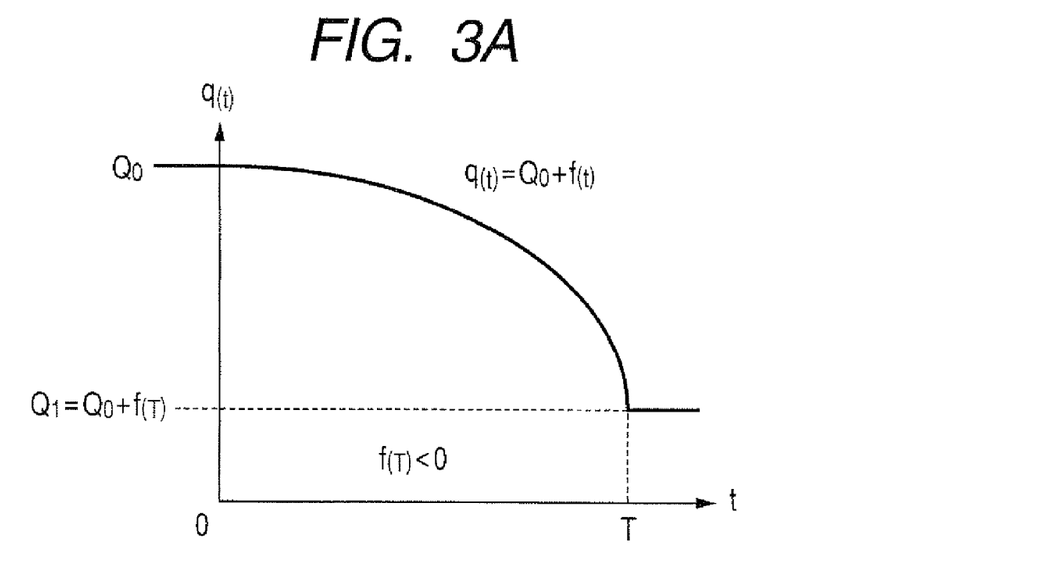
FIG. 3A and FIG. 3B are graphs showing an amount q(t) of electric charge accumulated in a piezoelectric actuator and an energy e(t) of the piezoelectric actuator.
Figure 3B:
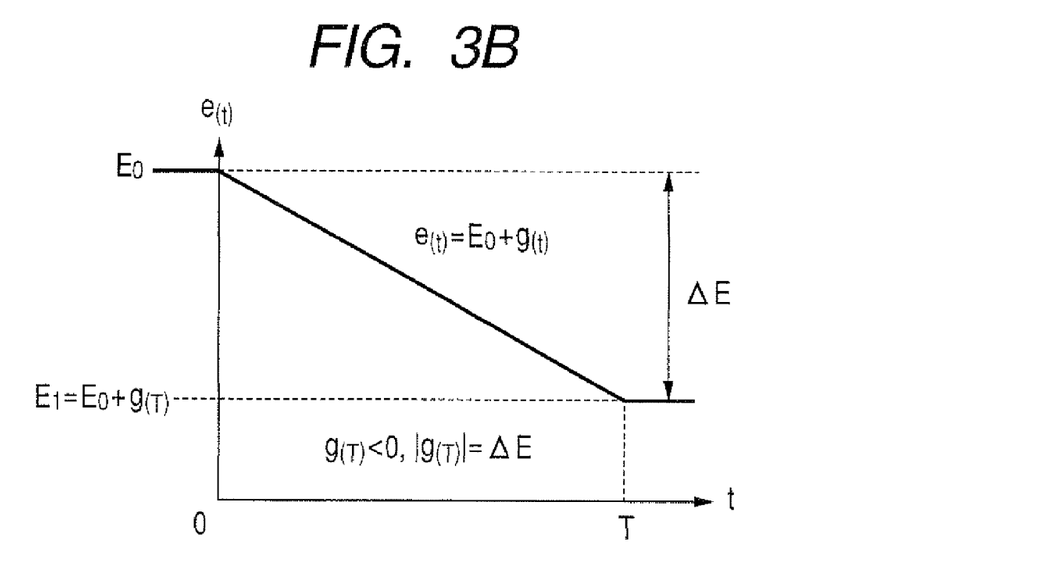

FIG. 3A and FIG. 3B are graphs showing the amount q(t) of electric charge accumulated in the piezoelectric actuator 1 and the energy e(t) of the piezoelectric actuator 1.

As shown in FIG. 3A, when the discharged electric charge as the integral value of the discharging current of the piezoelectric actuator 1 is designated by f(t), the amount q(t) of the electric charge accumulated in the piezoelectric actuator 1 during the discharging control is expressed by the time function $q(t) = Q_0 + f(t)$.

Because the discharging current is negative and the function f(t) is increased to the negative direction, the amount q(t) of the electric charge accumulated in the piezoelectric actuator 1 is decreased according to the elapse of time. In FIG. 3A, Q1 designates the amount q(t) of the electric charge when the discharging period of time is elapsed.

Further, as shown in FIG. 3B, when the discharging energy of the piezoelectric actuator 1 is designated by g(t), it is possible to express the energy accumulated in the piezoelectric actuator 1 by the time function $e(t) = E_0 + g(t)$.

When the discharging progresses, the discharging energy g(t) is increased in the negative direction, and the piezoelectric energy e(t) is decreased from $E_0$ according to the elapse of time.

In FIG. 3B, E1 designates the piezoelectric energy e(T) when the discharging period of time is elapsed. The absolute value of the discharging energy g(T) per discharging time T corresponds to the discharging energy $\Delta E$.

When the electrostatic capacity of the piezoelectric actuator 1 is designated by C, the piezoelectric energy e(t) can be expressed by the following equation (4):

$$e_{(t)} = \frac{q_{(t)}^2}{2C}. \tag{4}$$

The equation (4) can be rearranged from the relationship of $C = Q_0^2/2 \times E_0$ as follows:

$$e_{(t)} = \frac{E_0}{Q_0^2} \times q_{(t)}^2. \tag{5}$$

Further, the following equation (6) can be obtained by differentiating the equation (5) with time.

$$\frac{d}{dt}e_{(t)} = \frac{E_0}{Q_0^2} \times 2q_{(t)} \times \frac{d}{dt}q_{(t)}. \tag{6}$$

In order to obtain a constant discharging energy of the piezoelectric actuator 1, it is necessary to control q(t) so that the value of the equation (6) becomes constant.

As shown in FIG. 3B, it is necessary that the discharging energy g(t) is linearly changed per time in order to linearly decrease the piezoelectric energy e(t). That is, it is necessary to have the relationship of $g(t) = \alpha \times t + \beta$.

The left side of the equation (6) designates the discharging energy changing rate of the piezoelectric actuator 1 and equals to $\Delta E/T$, where $\Delta E$ designates the energy E to be discharged, and T denotes time.

From the above relationships, the following equation (7) can be established.

$$\frac{d}{dt}e_{(t)} = \frac{d}{dt}(E_0 + g_{(t)}) = \frac{d}{dt}g_{(t)} = \alpha = -\frac{\Delta E}{T}. \tag{7}$$

In order to adjust the discharging energy changing rate of the piezoelectric actuator 1 to $\Delta E/T$ based on the equations (6) and (7), it is sufficient to control the amount q(t) of the electric charge accumulated in the piezoelectric actuator 1 while satisfying the following equation (8).

$$\frac{E_0}{Q_0^2} \times 2q_{(t)} \times \frac{d}{dt}q_{(t)} = -\frac{\Delta E}{T}. \tag{8}$$

Figure 4:
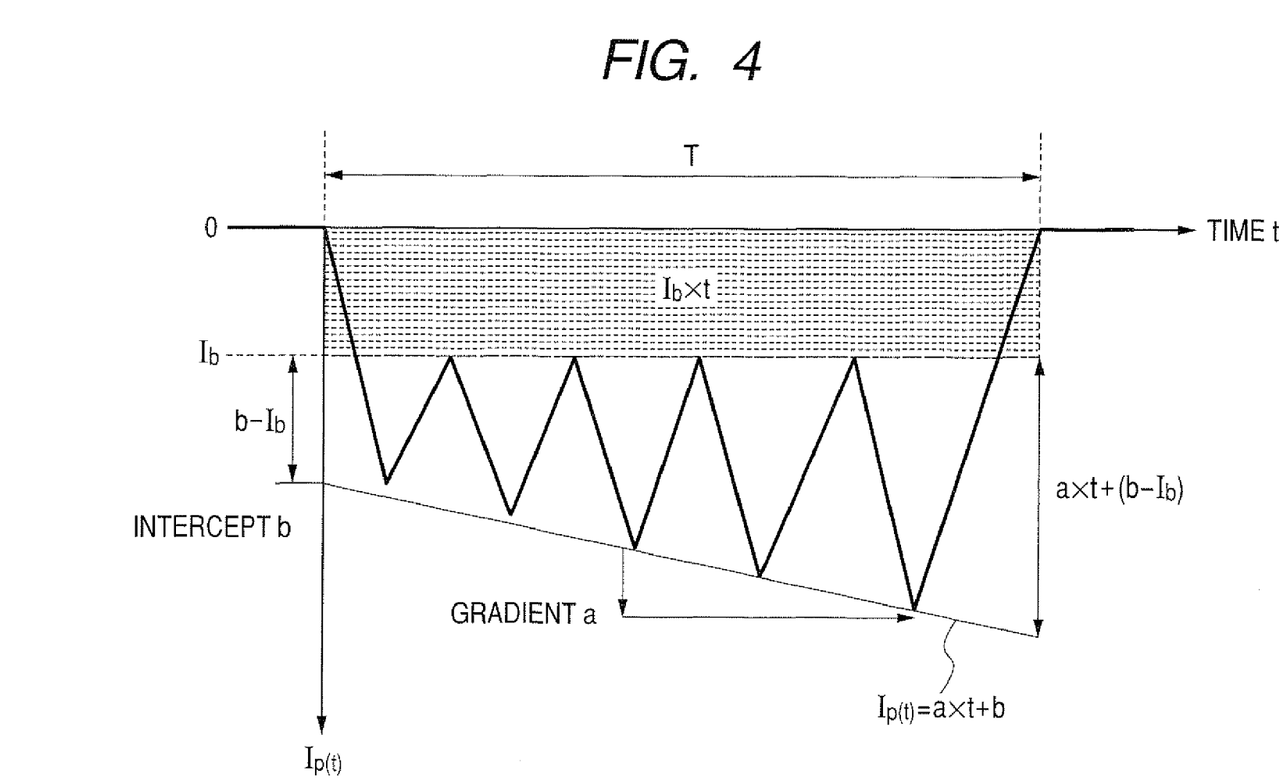
FIG. 4 is a explanatory diagram showing a method of obtaining a discharging current waveform and an amount of electric charge discharged from the piezoelectric actuator.

FIG. 4 is a explanatory diagram showing a method of obtaining the waveform of the discharging current and an amount of discharged electric charge. When the peak threshold value Ip(t) is increased in proportion to time under the discharging control by the discharging control circuit 19, the discharging current has the waveform shown in FIG. 4 in which the peak value (in negative direction) is gradually increased. The integral value (area) of the waveform of the discharging current corresponds to the discharged electric charge f(t).

It is possible to obtain an approximation of the discharged electric charge f(t) by adding a half area of a trapezoid and an area of a rectangle, where the rectangle is expressed by Ib×t (the bottom threshold value Ib×time t), the trapezoid is expressed by $[(b-Ib)+\{a \times t+(b-Ib)\}] \times t \times 1/2$, where the gradient of a line connected between the peaks of the discharging current is designated by "a", and the intercept at the time 0 of the discharge current is designated by "b" (that is, the intercept of the peak threshold value Ip(t)).

Therefore the following equation (9) can be established.

$$f_{(t)} = \underbrace{\frac{[(b-I_b)+\{a \times t+(b-I_b)\}] \times t}{2}}_{\text{AREA OF TRAPEZOID}} \times \frac{1}{2} + \underbrace{I_b \times t}_{\text{AREA OF RECTANGLE}} \tag{9}$$

$$= \frac{a}{4} \times t^2 + \frac{b+I_b}{2} \times t.$$

Accordingly, it is possible to express the amount q(t) of the electric charge of the piezoelectric actuator 1 based on the relationship of $q(t)=Q_0+f(t)$ and the equation (9) by the following equation (10).

$$q_{(t)} = Q_0 + \left(\frac{a}{4} \times t^2 + \frac{b+I_b}{2} \times t\right). \tag{10}$$

It is therefore possible to control the discharging energy changing rate of the piezoelectric actuator 1 by $\Delta E/T$ while satisfying the relationship of the equations (8) and (10).

When the equation (10) is differentiated, the following equation (11) is obtained.

$$\frac{d}{dt}q_{(t)} = \frac{d}{dt}\left\{Q_0 + \left(\frac{a}{4} \times t^2 + \frac{b+I_b}{2} \times t\right)\right\} = \frac{a}{2} \times t + \frac{b+I_b}{2}. \tag{11}$$

When the equation (10) and the equation (11) are substituted into the equation (8), the following equation (12) is obtained. The following equation (14) can be obtained by rearranging the following equation (13) after the equation (12) is rearranged to the equation (13).

$$\frac{d}{dt}e_{(t)} = \frac{E_0}{Q_0^2} \times 2\left\{Q_0 + \left(\frac{a}{4} \times t^2 + \frac{b+I_b}{2} \times t\right)\right\} \times \left(\frac{a}{2} \times t + \frac{b+I_b}{2}\right) \tag{12}$$

$$= -\frac{\Delta E}{T}.$$

$$\frac{\Delta E}{T} = -\frac{2E_0}{Q_0^2} \times \left\{Q_0 + \left(\frac{a}{4} \times T^2 + \frac{b+I_b}{2} \times T\right)\right\} \times \left(\frac{a}{2} \times T + \frac{b+I_b}{2}\right). \tag{13}$$

and $$-\frac{\Delta E \times Q_0^2}{2E_0 \times T} = \left\{Q_0 + \left(\frac{a}{4} \times T^2 + \frac{b+I_b}{2} \times T\right)\right\} \times \left(\frac{a}{2} \times T + \frac{b+I_b}{2}\right). \tag{14}$$

On the other hand, the energy $\Delta E$ to be discharged can be expressed by the following equation (15) using the equation (5).

$$\Delta E = e_{(0)} - e_{(T)} = E_0 - e_{(T)} = E_0 - \frac{E_0}{Q_0^2}(Q_0 + f_{(T)})^2. \tag{15}$$

The following equation (16) is obtained by expressing f(T) in the equation (15) using the equation (9), and the following equations (17) to (19) are obtained by rearranging the equation (16).

$$\Delta E = E_0 - \frac{E_0}{Q_0^2}\left\{Q_0 + \left(\frac{a}{4} \times T^2 + \frac{b+I_b}{2} \times T\right)\right\}^2. \tag{16}$$

$$\frac{E_0 - \Delta E}{E_0} \times Q_0^2 = \left\{Q_0 + \left(\frac{a}{4} \times T^2 + \frac{b+I_b}{2} \times T\right)\right\}^2. \tag{17}$$

$$Q_0 + \left(\frac{a}{4} \times T^2 + \frac{b+I_b}{2} \times T\right) = Q_0\sqrt{\frac{E_0 - \Delta E}{E_0}}. \tag{18}$$

and $$\frac{b+I_b}{2} = -\frac{Q_0}{T}\left(1 - \sqrt{\frac{E_0 - \Delta E}{E_0}}\right) - \frac{a}{4} \times T. \tag{19}$$

The following equation (20) is obtained by substituting the equation (18) into the equation (14), and the following equations (21) and (22) are obtained by rearranging the equation (20).

$$-\frac{\Delta E \times Q_0^2}{2E_0 \times T} = Q_0\sqrt{\frac{E_0 - \Delta E}{E_0}} \times \left(\frac{a}{2} \times T + \frac{b+I_b}{2}\right). \tag{20}$$

$$\frac{a}{2} \times T + \frac{b+I_b}{2} = -\frac{\Delta E \times Q_0}{2E_0 \times T}\sqrt{\frac{E_0}{E_0 - \Delta E}}. \tag{21}$$

and $$\frac{a}{4} \times T = -\frac{\Delta E \times Q_0}{4E_0 \times T}\sqrt{\frac{E_0}{E_0 - \Delta E}} - \frac{b+I_b}{4}. \tag{22}$$

The intercept "b" is obtained by substituting the equation (22) into the equation (19). That is, the following equation (23) is obtained by substituting the equation (22) into the equation (19). The equation (24) is obtained by changing the equation (23). The intercept "b" is obtained from the equation (24). The equation (25) expresses the intercept "b".

$$\frac{b+I_b}{2} = -\frac{Q_0}{T}\left(1 - \sqrt{\frac{E_0 - \Delta E}{E_o}}\right) + \frac{\Delta E \times Q_0}{4E_0 \times T}\sqrt{\frac{E_0}{E_0 - \Delta E}} + \frac{b+I_b}{4}. \tag{23}$$

$$\frac{b+I_b}{4} = \frac{\Delta E \times Q_0}{4E_0 \times T}\sqrt{\frac{E_0}{E_0 - \Delta E}} - \frac{Q_0}{T}\left(1 - \sqrt{\frac{E_0 - \Delta E}{E_0}}\right). \tag{24}$$

and $$b = \frac{\Delta E \times Q_0}{E_0 \times T}\sqrt{\frac{E_0}{E_0 - \Delta E}} - \frac{4Q_0}{T}\left(1 - \sqrt{\frac{E_0 - \Delta E}{E_0}}\right) - I_b. \tag{25}$$

The gradient "a" is obtained by substituting the equation (22) into the equation (24). That is, the following equation (26) is obtained by substituting the equation (24) into the equation (22). The equation (27) is obtained by rearranging the equation (26). The gradient "a" is obtained from the equation (27). The equation (28) expresses the gradient "a".

$$\frac{a}{4} = -\frac{\Delta E \times Q_0}{4E_0 \times T^2}\sqrt{\frac{E_0}{E_0 - \Delta E}} + \tag{26}$$

$$\frac{Q_0}{T_2}\left(1 - \sqrt{\frac{E_0 - \Delta E}{E_0}}\right) - \frac{\Delta E \times Q_0}{4E_0 \times T^2}\sqrt{\frac{E_0}{E_0 - \Delta E}}.$$

$$\frac{a}{4} = -\frac{\Delta E \times Q_0}{2E_0 \times T^2}\sqrt{\frac{E_0}{E_0 - \Delta E}} + \frac{Q_0}{T^2}\left(1 - \sqrt{\frac{E_0 - \Delta E}{E_0}}\right). \tag{27}$$

and $$a = -\frac{2\Delta E \times Q_0}{E_0 \times T^2}\sqrt{\frac{E_0}{E_0 - \Delta E}} + \frac{4Q_0}{T^2}\left(1 - \sqrt{\frac{E_0 - \Delta E}{E_0}}\right). \tag{28}$$

The equation (3) is obtained by substituting the equation (25) and the equation (28) into the relationship of Ip(t)=a×t+b.

The following equation (29) is obtained by rearranging the equation (3). The equation (29) is written in the claims according to the present invention.

$$I_{p(t)} = \frac{2Q_0}{T}\left[\left\{-\frac{\Delta E}{E_0 \times T}\sqrt{\frac{E_0}{E_0 - \Delta E}} + \frac{2}{T}\left(1 - \sqrt{\frac{E_0 - \Delta E}{E_0}}\right)\right\} \times t + \left\{\frac{\Delta E}{2E_0}\sqrt{\frac{E_0}{E_0 - \Delta E}} - 2\left(1 - \sqrt{\frac{E_0 - \Delta E}{E_0}}\right)\right\}\right] - I_b. \quad (29)$$

Because the charging direction is positive through the first embodiment of the present invention, as shown in FIG. 4, the gradient "a" and the intercept "b" of the peak threshold value Ip(t) of the discharging current in the piezoelectric actuator 1 become negative values.

As can be understood from the equation (28), because the gradient "a" is in proportion to the amount $Q_0$ of the electric charge accumulated in the piezoelectric actuator 1, the more the amount $Q_0$ of the electric charge is increased, the more the gradient "a" is increased in the negative direction to which the peak threshold value Ip(t) is increased.

In addition, because the value "−Ib" is a positive value, the part other than the value "−Ib" in the intercept in the equation (25) has a negative value and in proportion to the amount $Q_0$ of the electric charge. Accordingly, the more the amount $Q_0$ of the electric charge is increased, the more the intercept "b" is increased in the negative direction to which the peak threshold value Ip(t) is increased. That is, when the values $E_0$, $\Delta E$, T, and Ib are not changed, the more the amount $Q_0$ of the electric charge is increased, the more the gradient "a" and the intercept "b" are increased in the direction to which the peak threshold value Ip(t) is increased.

A description will now be given of the following effects (1) to (3) of the piezoelectric actuator drive device 30 according to the first embodiment of the present invention.

(1) Because the discharging energy changing rate $\Delta$ E/T can be adjusted, it is possible to adjust the discharging energy changing rate to an optional constant value, where the discharging energy $\Delta$ E and the discharging period T of time are supplied to the threshold value setting circuit 20.

(2) Because the gradient "a" and the intercept "b" of the peak threshold value Ip(t) is set according to the detection value of $Q_0$, it is possible to efficiently adjust the discharging energy changing rate to a target constant value (in the case shown in FIG. 5, $\Delta$ E/T=40 mJ/80 μs), even if the capacitance of the piezoelectric actuator 1 is changed according to the temperature change.

Figure 5:
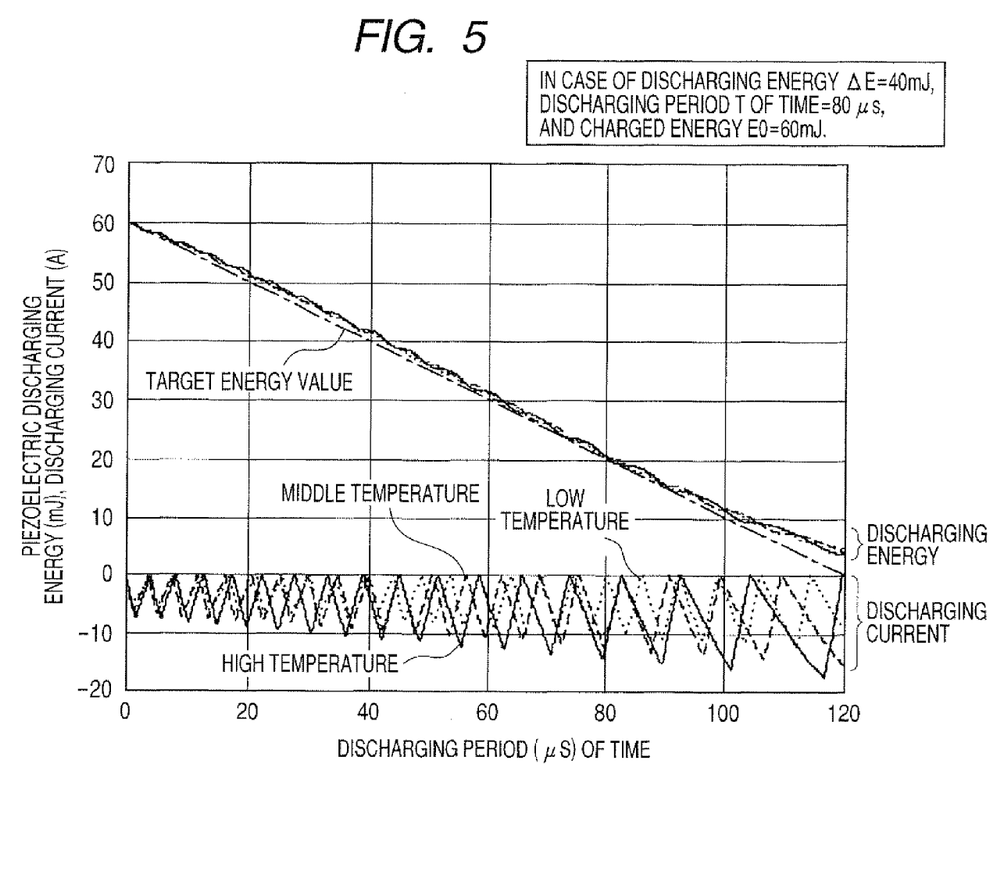
FIG. 5 is a view of a first graph showing simulation results.

FIG. 5 is a view of a first graph showing the simulation result of the discharging current and the discharging energy when the peak threshold value Ip(t) is obtained by the equation (29), where the $E_0$=60 mJ, $\Delta$ E=40 mJ, T=80 μs, and Ib=0A. This simulation estimates the peak threshold value Ip(t) is obtained under the assumption of the amount of the piezo electric charge being 6 μF and the amount $Q_0$ of the accumulated electric charge being 849 μC.

Figure 6:
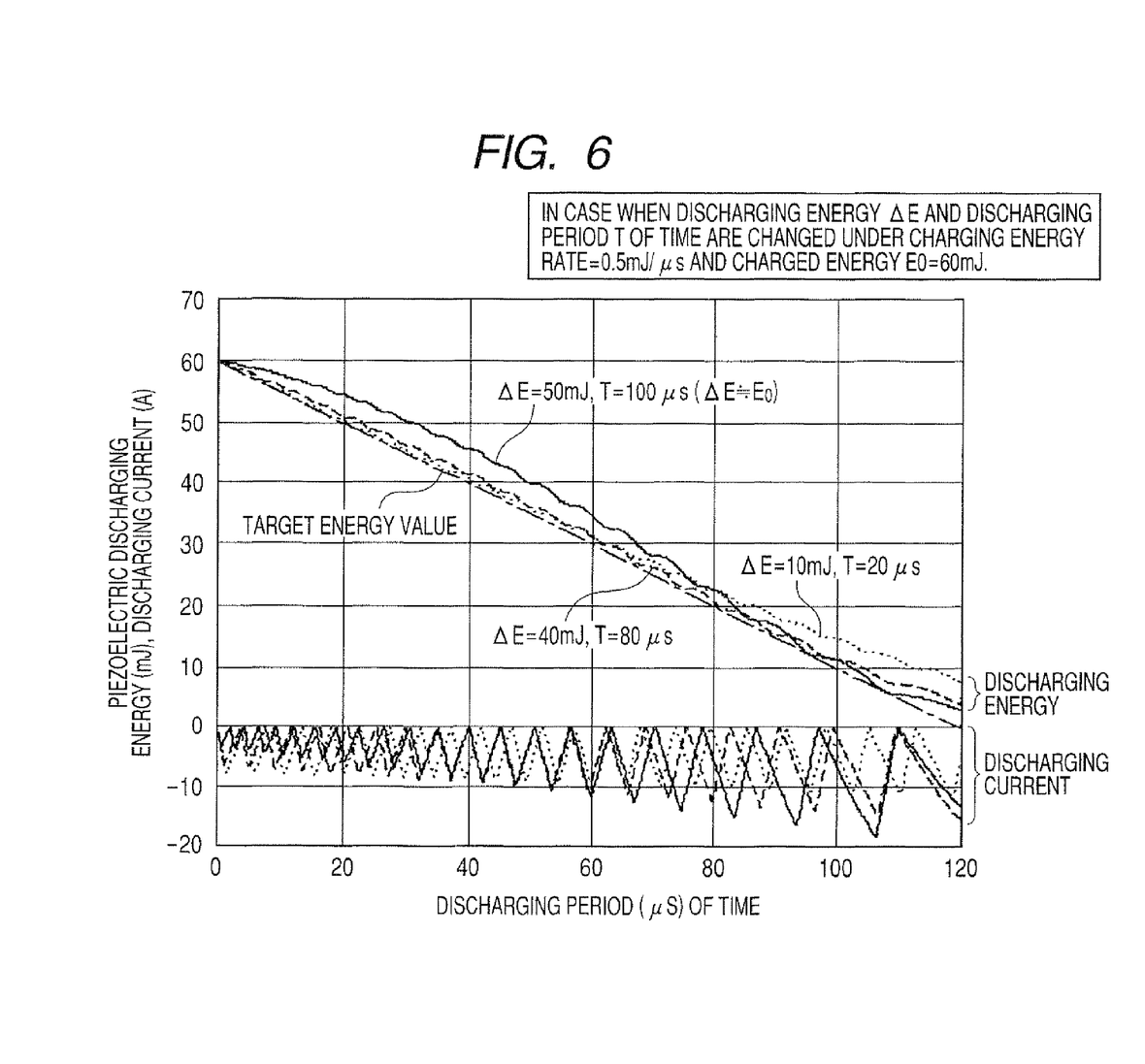
FIG. 6 is a view of a second graph showing simulation results.
Figure 7:
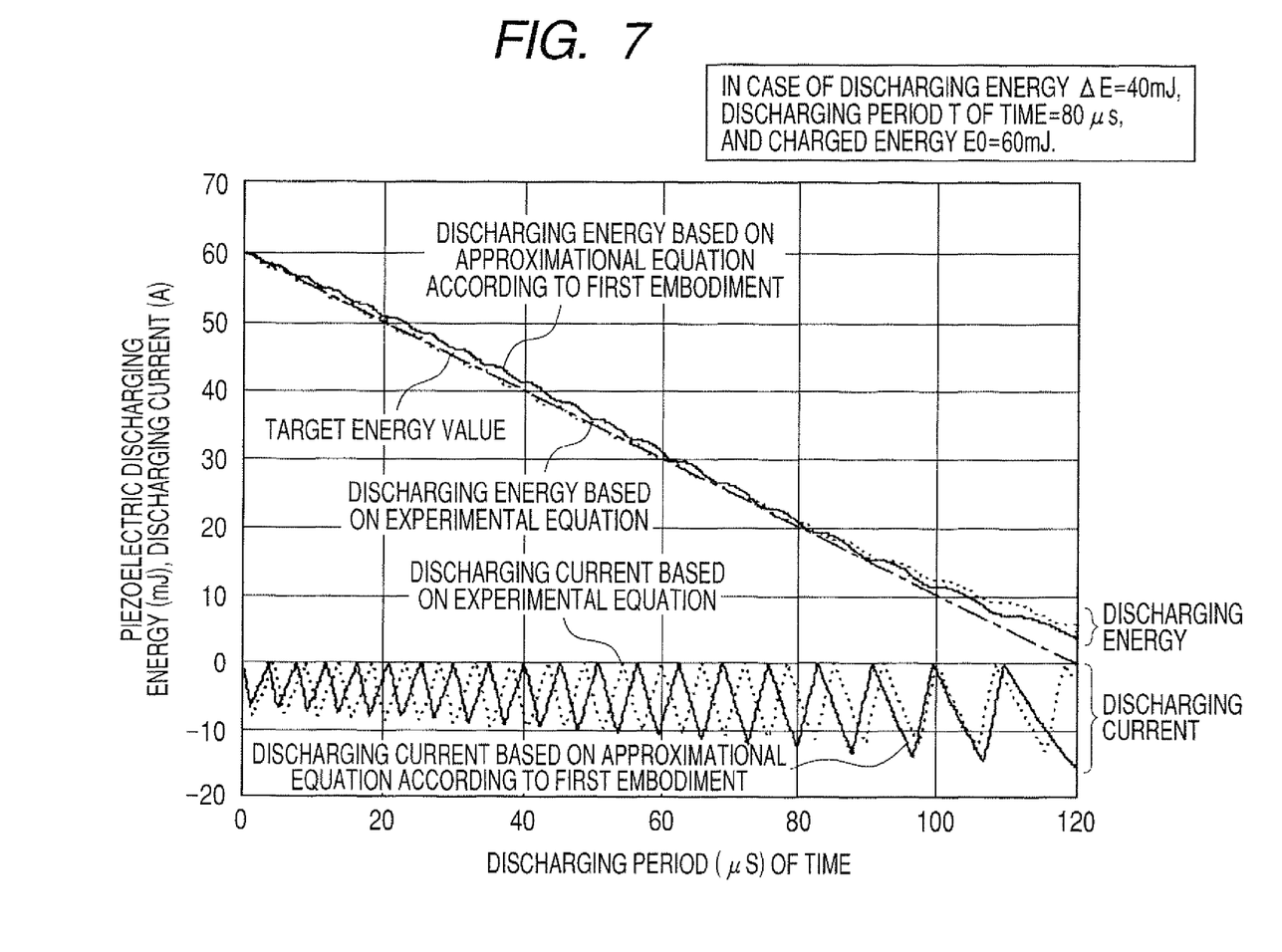
FIG. 7 is a view of a third graph showing simulation results.

FIG. 6 is a view of a second graph showing the simulation results. FIG. 7 is a view of a third graph showing the simulation results.

In FIG. 5, FIG. 6, and FIG. 7, the target energy value designated by alternate long and short dash lines means the energy which is decreased by the rate of $\Delta$ E/T(=0.5 mJ/μs) from the charged energy $E_0$ (=60 mJ) at the start time of the discharging.

(3) Further, because the discharging energy changing rate ($\Delta$ E/T) to be controlled is a known value, it is possible to simply obtain the discharged energy amount (=t×$\Delta$ E/T) based on the discharging period t of time.

When the discharged energy amount is a known value, the energy amount remained in the piezoelectric actuator 1 can be obtained. It is therefore possible to control the piezoelectric actuator 1 based on the remaining energy amount.

In the first embodiment, the charging control circuit 18 corresponds to a charging control means. The resistance 13, the amplifying circuit 14, the comparators 16 and 17, and the discharging control circuit 19 correspond to a discharging control means. The resistance 13 and the amplifying circuit 14 correspond to a discharging current detection means. The resistance 13, the amplifying circuit 14, the integral circuit 15, and the threshold value setting circuit 20 correspond to a threshold value setting means. The resistance 13, the amplifying circuit 14, and the integral circuit 15 correspond to a charging electric charge detection means.

On the other hand, it is possible to form each of the charging control circuit 18, the discharging control circuit 19, and the threshold value setting circuit 20 by a microcomputer and specially designed ICs. It is also possible to integrate at least two circuits in the circuits 18 to 20 to a single IC.

Although the first embodiment uses the bottom threshold value Ib of zero, it is possible to use an optional value, for example a value which approximately agrees with the peak threshold value Ip in order to relax the vibration by decreasing a difference between the discharging current and the bottom threshold value, as small as possible.

Second Embodiment

A description will be given of the piezoelectric actuator control device according to the second embodiment of the present invention.

The configuration of the piezoelectric actuator control device according to the second embodiment is basically equal to that of the piezoelectric actuator control device according to the first embodiment. Difference features of the piezoelectric actuator control device according to the second embodiment from those of the piezoelectric actuator control device according to the first embodiment will mainly explained.

As shown by solid line in FIG. 6, when the discharging energy $\Delta$ E is nearly equal to the charged energy $E_0$ based on the equation (29), an approximation error of calculating the electric charge becomes large, and an error from the energy discharging change rate (as a target energy value) becomes large. In this case, the equation (29) cannot be obtained from the relationship of $\Delta$ E=$E_0$.

Further, when the discharging energy $\Delta$ E is large and the discharging period T of time is small even if the rate between the discharging energy $\Delta$ E and the discharging period T of time is not changed, there is a tendency to have a different error from a desired energy discharging change rate. That is, there is a possibility of having a different energy change profile.

FIG. 6 shows the simulation results of the discharging current and the discharging energy when the peak threshold value Ip(t) was set using the equation (29) while changing three times a combination of the discharging energy $\Delta$ E and the discharging period T of time under the condition of $E_0$=60 mJ, Ib=0A, and $\Delta$ E/T=0.5 mJ/μs. This simulation shown in FIG. 6 used an electrostatic capacity of the piezoelectric actuator 1 of 6 μF, and the charged amount $Q_0$ of the electric charge of 849 μC obtained from the $E_0$=60 mJ.

In the second embodiment of the present invention, it is possible to have a same value of the peak threshold value Ip(t) unless the ratio of $\Delta E/T$ is not changed, namely same when the threshold value setting circuit 20 sets the peak threshold value Ip(t) based on the following equation (30). This can obtain the same energy change rate even if the ratio of $\Delta E/T$ takes a different value, and it is thereby possible to improve the accuracy.

$$I_{p(t)} = 2\frac{Q_0}{T}\left((1-\sqrt{2})\frac{\Delta E^2}{E_0^2 T}t - \frac{\Delta E}{2E_0}\right) - I_b. \tag{30}$$

The equation (30) is an experimental equation that is obtained from the experimental results performed based on the equation (29) used in the first embodiment.

In the equation (30), the peak threshold value Ip(t) and the bottom threshold value Ib are positive in the charging direction. In the equation (30), the term ($\Delta E^2/E_0^2 T$) corresponds to the gradient "a" of the peak threshold value Ip(t). The more the amount $Q_0$ of the accumulated electric charge is increased, the more the gradient "a" is increased in the negative direction toward the direction to increase the peak threshold value Ip(t).

Further, in the equation (30), the term $\Delta E/2E_0$ corresponds to the intercept "b" of the peak threshold value Ip(t). The more the amount $Q_0$ of the charged electric charge is increased, the more the intercept "b" is also increased in the negative direction toward the direction to increase the peak threshold value Ip(t).

FIG. 7 shows the simulation results of the discharging current and the discharging energy in both the cases in which one uses the peak threshold value Ip(t) based on the equation (29) according to the first embodiment, and the other uses the peak threshold value Ip(t) based on the equation (30) as the experimental equation according to the second embodiment.

As shown in FIG. 7, using the equation (30) makes it possible to decrease an error of the energy discharging change rate when compared with the first embodiment using the equation (29).

By the way, although omitted from the structure of the piezoelectric actuator control device 30 according to the present invention shown in FIG. 1, a plurality of the piezoelectric actuators 1 corresponding to a plurality of the cylinders of the engine is connected to the inductor 5. A plurality of switches (each acts as a cylinder selecting switch made of a MOSFET) is placed between the piezoelectric actuators 1 and the resistance 13.

In order to drive one of the piezoelectric actuators 1, the cylinder selecting switch corresponding to the target piezoelectric actuator 1 to be driven is turned ON and the target piezoelectric actuator 1 is thereby connected to the resistance 13.

The concept of the present invention is not limited by the above embodiments. For example, the piezoelectric actuator drive device according to the present invention can be applied to piezoelectric actuators to open and close valves in devices other than injectors.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A piezoelectric actuator drive device comprising:
an inductor connected in series to one or more piezoelectric actuators;
a charging path connected to a direct current (DC) power source and a series circuit composed of the inductor and the piezoelectric actuators in order to supply an electric power from the DC power source to the series circuit;
a charging switch placed on the charging path between the DC power source and the series circuit;
a discharging path connected in parallel to the serial circuit in order to discharge electric charge accumulated in the piezoelectric actuators;
a discharging switch connected in parallel to the series circuit and placed on the discharging path;
a first diode connected in parallel to the charging switch so that a cathode of the first diode is connected to a positive electrode of the DC power source;
a second diode connected in parallel to the discharging switch so that an anode of the second diode is connected to a negative electrode of the DC power source;
a charging control means that instructs the charging switch to be repeatedly turned ON and OFF in order to expand and contract the piezoelectric actuators when receiving a drive signal as an instruction signal supplied from an outside device;
a discharging control means comprising a discharging current detection means for detecting a discharging current from the piezoelectric actuators, and the discharging control means instructing the discharging switch to be turned ON when receiving a drive stop signal (as a drive signal) supplied from the outside device, and repeatedly performing ON and OFF operation of the discharging switch so that the discharging switch is turned OFF when detecting that the discharging current reaches a peak threshold value and the discharging switch is turned ON when detecting that the discharging current reaches a bottom threshold value; and
a threshold value setting means configured to set the peak threshold value so that the peak threshold value is increased in proportion to an elapse of time, the threshold value setting means comprising an electric charge detection means for detecting an amount of electric charge accumulated in the piezoelectric actuators by the charging control means,
the threshold value setting means configured to determine a gradient and an intercept of the peak threshold value per time in order to set a energy discharging change rate of the piezoelectric actuators into $\Delta E/T$ based on (a) to (e):
(a) a charged energy E0 accumulated into the piezoelectric actuators by the charging control means,
(b) a discharging energy $\Delta E$ to be discharged from the piezoelectric actuators by the discharging control means over (c) a discharging period of time T,
(d) the bottom threshold value, and
(e) the amount Q0 of the accumulated electric charge detected by the electric charge detection means,
and the threshold value setting means configured to set the peak threshold value based on the gradient, the intercept, and the elapse of time counted from a start time to discharge the piezoelectric actuators.

2. The piezoelectric actuator drive device according to claim 1, wherein the threshold value setting means increases the gradient and the intercept of the peak threshold value according to increases in the amount of the electric charge detected by the electric charge detecting means.

3. The piezoelectric actuator drive device according to claim 1, wherein the threshold value setting means sets the peak threshold value based on a following equation (1):

$$I_{p(t)} = \frac{2Q_0}{T}\left[\begin{array}{c}\left\{-\frac{\Delta E}{E_0 \times T}\sqrt{\frac{E_0}{E_0-\Delta E}} + \frac{2}{T}\left(1-\sqrt{\frac{E_0-\Delta E}{E_0}}\right)\right\}\times t + \\ \left\{\frac{\Delta E}{2E_0}\sqrt{\frac{E_0}{E_0-\Delta E}} - 2\left(1-\sqrt{\frac{E_0-\Delta E}{E_0}}\right)\right\}\end{array}\right] - I_b. \quad (1)$$

where $I_{p(t)}$ is the peak threshold value under a positive charging direction, and Ib is the bottom threshold value under the positive charging direction.

4. The piezoelectric actuator drive device according to claim 2, wherein the threshold value setting means sets the peak threshold value based on a following equation (1):

$$I_{p(t)} = \frac{2Q_0}{T}\left[\begin{array}{c}\left\{-\frac{\Delta E}{E_0 \times T}\sqrt{\frac{E_0}{E_0-\Delta E}} + \frac{2}{T}\left(1-\sqrt{\frac{E_0-\Delta E}{E_0}}\right)\right\}\times t + \\ \left\{\frac{\Delta E}{2E_0}\sqrt{\frac{E_0}{E_0-\Delta E}} - 2\left(1-\sqrt{\frac{E_0-\Delta E}{E_0}}\right)\right\}\end{array}\right] - I_b. \quad (1)$$

where $I_{p(t)}$ is the peak threshold value under a positive charging direction, and Ib is the bottom threshold value under the positive charging direction.

5. The piezoelectric actuator drive device according to claim 1, wherein the threshold value setting means sets the peak threshold value based on a following equation (2):

$$I_{p(t)} = 2\frac{Q_0}{T}\left((1-\sqrt{2})\frac{\Delta E^2}{E_0^2 T}t - \frac{\Delta E}{2E_0}\right) - I_b. \quad (2)$$

where $I_{p(t)}$ is the peak threshold value under a positive charging direction, and Ib is the bottom threshold value under the positive charging direction.

6. The piezoelectric actuator drive device according to claim 2, wherein the threshold value setting means sets the peak threshold value based on a following equation (2):

$$I_{p(t)} = 2\frac{Q_0}{T}\left((1-\sqrt{2})\frac{\Delta E^2}{E_0^2 T}t - \frac{\Delta E}{2E_0}\right) - I_b. \quad (2)$$

where $I_{p(t)}$ is the peak threshold value under a positive charging direction, and Ib is the bottom threshold value under the positive charging direction.

7. The piezoelectric actuator drive device according to claim 1, wherein the electric charge detection means detects the charging current supplied to the piezoelectric actuators when the charging control means instructs the charging switch to charge the piezoelectric actuators, and detects the amount of the electric charge accumulated in the piezoelectric actuators by integrating the detected charging current.

8. The piezoelectric actuator drive device according to claim 2, wherein the electric charge detection means detects the charging current supplied to the piezoelectric actuators when the charging control means instructs the charging switch to charge the piezoelectric actuators, and detects the amount of the electric charge accumulated in the piezoelectric actuators by integrating the detected charging current.

* * * * *